UNITED STATES PATENT OFFICE.

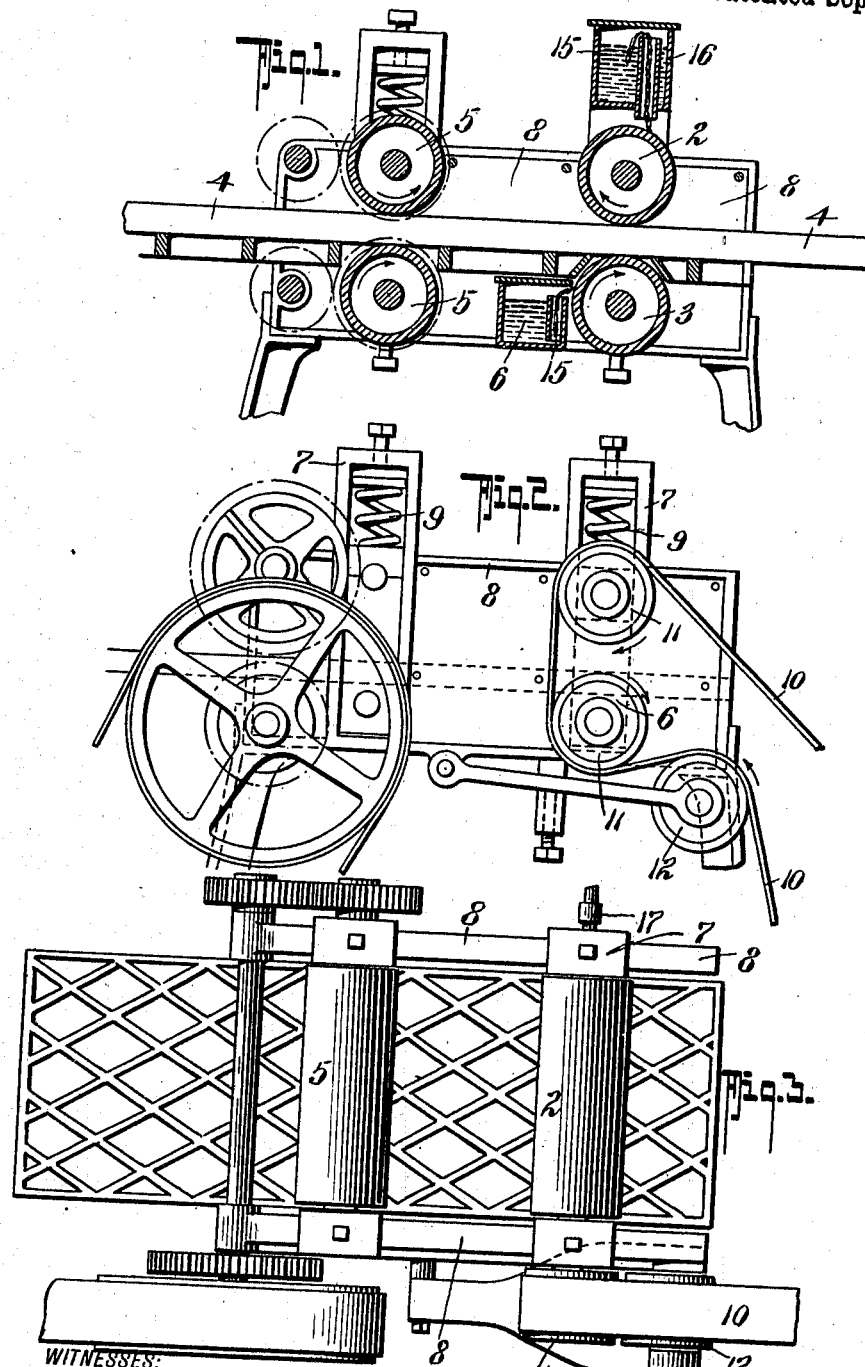

JOHN WARREN BELL, OF VANCOUVER, BRITISH COLUMBIA, CANADA.

WOOD-SURFACING MACHINE.

970,875.  Specification of Letters Patent.  Patented Sept. 20, 1910.

Application filed November 27, 1908. Serial No. 464,583.

*To all whom it may concern:*

Be it known that I, JOHN WARREN BELL, a citizen of the Dominion of Canada, residing at Vancouver, in the Province of British Columbia, Canada, have invented a new and useful Wood-Surfacing Machine, of which the following is a specification.

This invention relates to a machine for planishing or putting a finished surface on dressed lumber such as is delivered from a planing or molding machine, and is designed to prepare such lumber in a condition for the finished interior of a house.

Dressed lumber as delivered from a planing machine has not usually a surface sufficiently smooth for interior work, and requires to be hand planed or sand papered. This involves a considerable amount of labor, or if the sand papering is done in a machine, if the wood is soft, as in the case of cedar, a wooly surface is thrown up which is objectionable on finished work.

In the machine which is the subject of this application the planed surface of the board is passed over or under a rapidly revolving highly polished roller which is applied to the surface of the wood with considerable pressure, and by virtue of the rapid friction of the highly polished surface and by the heat engendered by that friction, a hard finished surface is formed on the wood, the softer grain being filled with the resinous matter of the wood which resin is spread by the heat. If found necessary the planishing roll may be artificially heated and oil or wax may be applied either to the wood or to the planishing roll. The surface thus formed is not only highly polished, but being hard is less liable to injury.

The invention is particularly described in the following specification, reference being made to the drawings by which it is accompanied in which:

Figure 1, is a cross section through the rolls of the machine, showing the application of planishing rolls for finishing both sides of a planed board. Fig. 2, a side elevation of the same and Fig. 3, a plan with the oil vessel removed.

In these drawings 2 and 3 represent upper and lower planishing rolls between which the board 4 is fed, either from the delivery feed rolls of a planing machine, where the machine is applied as an attachment to such planing machine, or by feed rolls 5 forming part of the machine itself. The rolls 2 and 3 are highly polished and are rotatable at a high rate of speed in bearing boxes 6 which are vertically movable in guides 7 in the side frames 8, of the machine; springs 9 being interposed between the bearing boxes and the ends of their guides by which an adjustable pressure may be applied to press the rollers strongly on the surface of the board.

The planishing rolls 2 and 3 may be driven by any appropriate means preferably in opposite directions so that the friction of one is counterbalanced by that of the other, and to avoid dust or chips being drawn in to the rolls the upper one should be driven in a direction opposite to that of the feed.

As drawn the planishing rolls are driven by a belt 10 passing over the pulleys 11 in the manner shown in Fig. 2 to drive them in opposite directions, a pivotally mounted tightening pulley 12 being applied to the slack side of the belt, which will also increase the arc of the belt contact on the lower pulley 11.

A light openwork table extends between the side frames to support the board in its passage to and between the rollers.

Where moldings require to be surfaced the periphery of the rollers both feed and polishing will obviously be formed to the outline of the molding, and means will be provided for supporting the molding to the rolls.

Melted wax, oil or other suitable dressing may be applied to the surface of the wood before it enters the rolls or to the rolls themselves which will not only serve to fill in the pores of the wood and with the heat help to form a hard surface, but will lessen the friction of the rolls on the wood. This may be done in any suitable manner. In the drawing it is shown as applied by means of a fabric siphon 15 from a vessel 16 extending across the roll.

If found necessary the rolls may be artificially heated by the delivery of steam at 17 to the hollow of the rolls.

If one pair of rolls is not sufficient to attain the desired result in the matter of finish or hardness of surface a second or third pair may be added; but this is not material to the invention, as it is merely a multiplication of the principal feature which consists in the combination with feed rolls of planishing rolls rotatable at a higher rate of speed in the manner described and of the application of oil or melted wax to the same.

Having now particularly described my invention and the manner of its use I hereby declare that what I claim as new and desire to be protected in by Letters Patent, is:

As a means for forming a finished surface on dressed lumber, the combination with feed rolls between which the wood is passed, of a polishing roller to engage the surface of the wood, means for pressing such roller against the surface of the wood, a stationary reservoir mounted adjacent to said roller and a capillary member carried by such reservoir to wipe against said roller to apply an unctuous material thereto, substantially as shown and for the purposes described.

In testimony whereof I have signed my name to this specification in the presence of two subscribing witnesses.

JOHN WARREN BELL.

Witnesses:
ROWLAND BRITTAIN,
KENNETH POOKE.